United States Patent
Hong

(10) Patent No.: US 11,995,997 B2
(45) Date of Patent: May 28, 2024

(54) METHODS AND APPARATUSES FOR CONFIGURING FLIGHT ROUTE, FLIGHT METHODS AND APPARATUSES, AND BASE STATIONS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 497 days.

(21) Appl. No.: 17/271,592

(22) PCT Filed: Aug. 30, 2018

(86) PCT No.: PCT/CN2018/103130
§ 371 (c)(1),
(2) Date: Feb. 25, 2021

(87) PCT Pub. No.: WO2020/042053
PCT Pub. Date: Mar. 5, 2020

(65) Prior Publication Data
US 2021/0343161 A1    Nov. 4, 2021

(51) Int. Cl.
G08G 5/00 (2006.01)
H04W 72/51 (2023.01)
H04B 7/185 (2006.01)
H04W 4/029 (2018.01)

(52) U.S. Cl.
CPC ......... *G08G 5/0034* (2013.01); *G08G 5/0069* (2013.01); *H04W 72/51* (2023.01)

(58) Field of Classification Search
None
See application file for complete search history.

(56) References Cited

U.S. PATENT DOCUMENTS

| 2014/0126527 A1* | 5/2014 | Xiong | H04W 56/001 |
| | | | 370/329 |
| 2018/0375568 A1* | 12/2018 | De Rosa | G08G 5/0069 |
| 2019/0098520 A1* | 3/2019 | Kim | H04W 76/27 |

(Continued)

FOREIGN PATENT DOCUMENTS

| CN | 106843263 A | 6/2017 |
| CN | 107632613 A | 1/2018 |

(Continued)

OTHER PUBLICATIONS

Written Opinion of the International Searching Authority issued in Application No. PCT/CN2018/103130, May 29, 2019, (9p).

(Continued)

*Primary Examiner* — Aniss Chad
*Assistant Examiner* — Madison R. Inserra
(74) *Attorney, Agent, or Firm* — Arch & Lake LLP

(57) ABSTRACT

The present disclosure relates to a method for configuring a flight route, a flight method, a base station, an unmanned aerial vehicle (UAV) and a computer readable storage medium. The method of configuring a flight route includes: obtaining flight route information of a UAV in a connected state which is served by the base station; and configuring the flight route information for the UAV through a radio resource control (RRC) signaling or a media access control (MAC) control element (CE) signaling.

7 Claims, 6 Drawing Sheets

```
┌─────────────────────────────────────────────────────┐
│ Obtain flight route information of a UAV in a       │  S101
│ connected state which is served by the base station │
└─────────────────────────────────────────────────────┘
                        │
                        ▼
┌─────────────────────────────────────────────────────┐
│ Configure the flight route information for the UAV  │  S102
│ through a radio resource control (RRC) signaling    │
│ or a media access control (MAC) control element     │
│ (CE) signaling                                      │
└─────────────────────────────────────────────────────┘
                        │
                        ▼
┌─────────────────────────────────────────────────────┐
│ Receive flight route reception confirmation         │  S103
│ information returned by the UAV                     │
└─────────────────────────────────────────────────────┘
```

(56) References Cited

U.S. PATENT DOCUMENTS

| | | | | |
|---|---|---|---|---|
| 2020/0077321 A1* | 3/2020 | Shi | .................. | H04W 48/02 |
| 2020/0192348 A1* | 6/2020 | Koziol | ................. | G08G 5/0013 |
| 2021/0021333 A1* | 1/2021 | Kusashima | ........... | H04L 5/0032 |
| 2021/0227534 A1* | 7/2021 | Määttanen | ........... | G08G 5/0069 |
| 2021/0241634 A1* | 8/2021 | Sarim | ................. | G08G 5/0013 |

FOREIGN PATENT DOCUMENTS

| | | |
|---|---|---|
| CN | 108064360 A | 5/2018 |
| CN | 108064465 A | 5/2018 |
| CN | 108401438 A | 8/2018 |
| WO | 2018083942 A1 | 5/2018 |

OTHER PUBLICATIONS

State Intellectual Property Office of the People's Republic of China, Office Action and Search Report Issued in Application No. 2018800018552, Feb. 10, 2021, 16 pages, (Submitted with Machine Translation).

International Search Report of PCT Application No. PCT/CN2018/103130 dated May 29, 2019 with English translation (4p).

First Office Action and Search Report issued in Chinese Application No. 201880001855.2, Jul. 17, 2020 with English translation, (21p).

Huawei, et al.,"Discussion on flight path information", 3GPP TSG-RAN WG2 Meeting #101bis, R2-1805125, Sanya, China, Apr. 16-20, 2018, (4p).

Xiaomi Communications, "Discussion on the procedure for the flight path information reporting", 3GPP TSG-RAN WG2 Meeting #102, R2-1808685, Busan, Korea, May 21-25, 2018, (2p).

\* cited by examiner

METHODS AND APPARATUSES FOR CONFIGURING FLIGHT ROUTE, FLIGHT METHODS AND APPARATUSES, AND BASE STATIONS

CROSS REFERENCE TO RELATED APPLICATIONS

This application is the national phase application of International Application No. PCT/CN2018/103130, filed on Aug. 30, 2018, the entire contents of which are incorporated herein by reference for all purposes.

TECHNICAL FIELD

The present disclosure relates to the field of communication technologies, and in particular to methods and apparatuses for configuring a flight route, flight methods and apparatuses, base stations, unmanned aerial vehicles (UAVs) and computer readable storage media.

BACKGROUND

A UAV is an unmanned aircraft operated by a radio remote control device and a self-contained program control device. The UAV actually is a generic term for unmanned aircrafts, and may be technically divided into an unmanned fixed-wing aircraft, an unmanned vertical take-off and landing aircraft, an unmanned airship, an unmanned helicopter, an unmanned multi-rotor aircraft and an unmanned parasol, and the like.

With rapid development of the UAV technology, reduction of costs and improvement of functions, UAVs are increasingly applied in various aspects of life. At present, the applications of UAVs in the fields such as aerial photography, agriculture, plant protection, miniature selfie, express transportation, disaster rescue, wild animal observation, infectious disease monitoring, surveying and mapping, news reports, power patrol, disaster relief, film and television photography, and romantic presentation greatly expand their uses. Therefore, many countries are actively seeking expansion of industrial applications and development of UAV technology.

To further expand the application scope of UAVs, the 3rd Generation Partnership Project (3GPP) approves the Enhanced Support for Aerial Vehicles for research and standardization, so that a cellular network provides satisfactory services for the UAVs.

Generally, a UAV flies in two modes: a fixed mode or a dynamic mode. In the fixed mode, an operator may plan a flight route of the UAV on a controller, so that the UAV may fly according to the planned route without uninterrupted control of the controller. In the dynamic mode, the operator needs to perform real-time remote control for the UAV through the controller all the time. Since the flight route and a flight trajectory of the UAV are fixed in the fixed mode, the cellular network can predict which cellular network base stations the UAV will pass through.

For different types of UAVs, flight routes of the UAVs may be configured by different methods. For a large UAV, the flight route of the UAV is generally configured by an unmanned aircraft system traffic management (UTM). The UTM needs to access a cellular network to control the UVA. However, no method is available for a base station to configure a flight route for a UAV in a connected state at present.

SUMMARY

The present disclosure provides a method and apparatus for configuring a flight route, a flight method and apparatus, a base station, an unmanned aerial vehicle and a computer readable storage medium. This enables the base station to configure flight route information for a UAV in a connected state, and thus, the UAV can make a flight according to the flight route information.

According to a first aspect of the present disclosure, there is provided a method of configuring a flight route. The method is applied to a base station. The method includes that the base station obtains flight route information of a UAV in a connected state. The base station serves the UAV. The base station configures the flight route information for the UAV through a radio resource control (RRC) signaling or a media access control (MAC) control element (CE) signaling.

According to a second aspect of the present disclosure, there is provided a flight method. The method is applied to a UAV in a connected state. The method includes that the UAV receives flight route information configured by a base station through an RRC signaling or an MAC CE signaling, and the UAV makes a flight according to the flight route information.

According to a third aspect of the present disclosure, there is provided a base station. The base station includes one or more processors and a non-transitory computer-readable storage medium for storing instructions executable by the one or more processors. The one or more processors are configured to perform acts including obtaining flight route information of a UAV in a connected state. The base station serves the UAV. The one or more processors are configured to perform acts further including configuring the flight route information for the UAV through an RRC signaling or an MAC CE signaling.

According to a fourth aspect of the present disclosure, there is provided a UAV. The UAV includes one or more processors, and a non-transitory computer-readable storage medium for storing instructions executable by the one or more processors. The one or more processors are configured to perform acts including receiving flight route information configured by a base station through an RRC signaling or an MAC CE signaling and making a flight according to the flight route information. The UAV is in a connected state.

According to a fifth aspect of the present disclosure, there is provided a non-transitory computer readable storage medium storing a plurality of programs for execution by a base station having one or more processors. The plurality of programs, when executed by the one or more processors, cause the base station to perform acts including obtaining flight route information of a UAV in a connected state. The base station serves the UAV. The plurality of programs cause the base station to perform acts further including configuring the flight route information for the UAV through an RRC signaling or a media access control (MAC) control element (CE) signaling.

According to a sixth aspect of the present disclosure, there is provided a non-transitory computer readable storage medium storing a plurality of programs for execution by a UAV having one or more processors, wherein the plurality of programs, when executed by the one or more processors, cause the UAV to perform acts including: receiving flight route information configured by a base station through an RRC signaling or an MAC CE signaling; and making a flight according to the flight route information. The UAV is in a connected state.

Technical solutions according to the examples of the present disclosure may include the following beneficial effects.

The flight route information of the UAV in a connected state which is served by the base station is obtained and then configured for the UAV through the RRC signaling or the MAC CE signaling. This enables the base station to configure the flight route information for the UAV in a connected state, and thus, the UAV can make a flight according to the flight route information.

By receiving flight route information configured by a base station through an RRC signaling or an MAC CE signaling, and making a flight according to the flight route information, the flight is made according to the flight route information configured by the base station.

It is to be understood that the above general descriptions and the subsequent detailed descriptions are merely exemplary and explanatory, and are not intended to limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
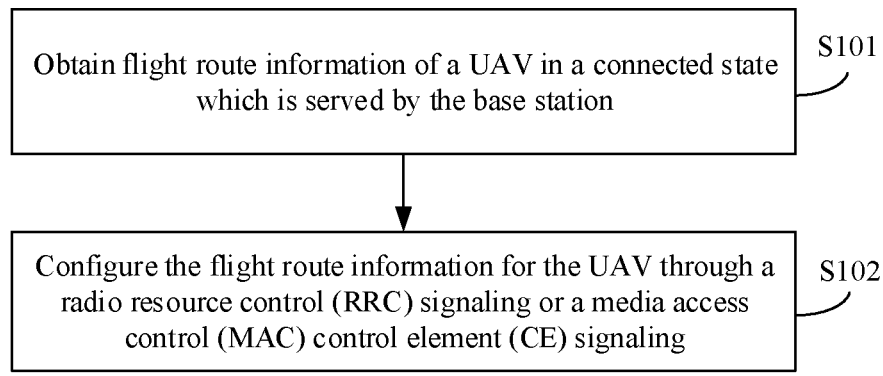
FIG. 1 is a flowchart illustrating a method of configuring a flight route according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of configuring a flight route according to an example of the present disclosure. In this example, descriptions are made from a base station side. As shown in FIG. 1, the method of configuring a flight route includes the following steps.

At step S101, flight route information of an unmanned aerial vehicle (UAV) in a connected state which is served by the base station is obtained.

The flight route information may include but not limited to one or more of flight route point information, flying speed, flying height, information about arrival time for each flight route point and take-off time for each flight route point of the UAV.

In this example, the flight route information of the UAV in a connected state which is served by the base station may be obtained in several manners such as the following.

In a first manner, the flight route information is obtained from a UAV management system.

In a second manner, the flight route information is obtained from a core network.

In this example, the flight route information of the UAV in a connected state which is served by the base station may be obtained in several manners, which is not limited herein.

At step S102, the flight route information is configured for the UAV through a radio resource control (RRC) signaling or a media access control (MAC) control element (CE) signaling.

The RRC signaling may include an RRC connection reconfiguration (RRCconnectionreconfiguration) signaling added with a flight route information unit. The MAC CE signaling includes a newly-added MAC CE signaling.

In the above example, by obtaining flight route information of a UAV in a connected state which is served by the base station and configuring the flight route information for the UAV through an RRC signaling or an MAC CE signaling, it enables the base station to configure the flight route information for the UAV in a connected state, and thus, the UAV can make a flight according to the flight route information.

Figure 2:
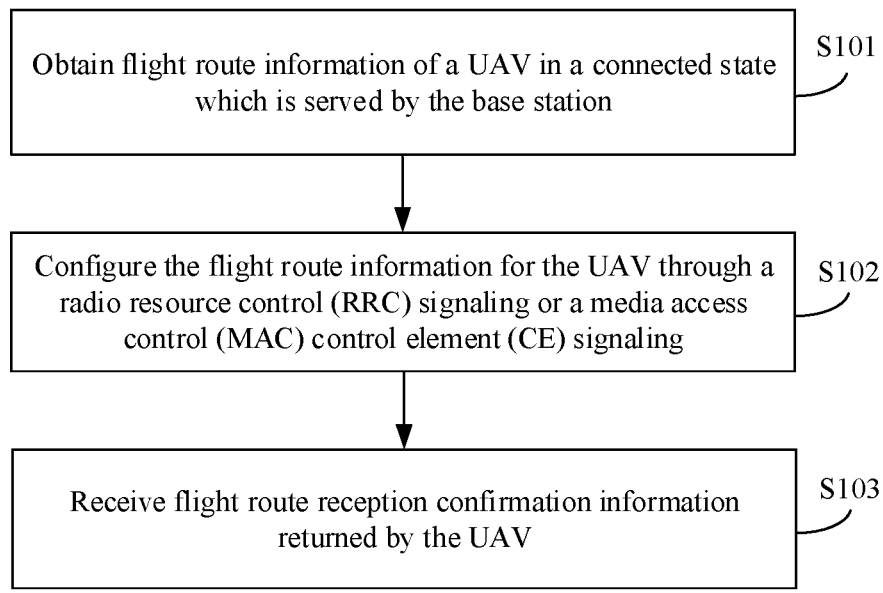
FIG. 2 is a flowchart illustrating another method of configuring a flight route according to an example of the present disclosure.

FIG. 2 is a flowchart illustrating another method of configuring a flight route according to an example of the present disclosure. As shown in FIG. 2, after step S102 is performed, the method may further include the following step.

At step S103, flight route reception confirmation information returned by the UAV is received.

Optionally, the method may further include: receiving flight route configuration completion information returned by the UAV. In this way, the base station knows that the UAV already completes configuration of the flight route information.

In the above example, by receiving flight route reception confirmation information returned by a UAV, a base station may know that the UAV already receives flight route information.

Figure 3:
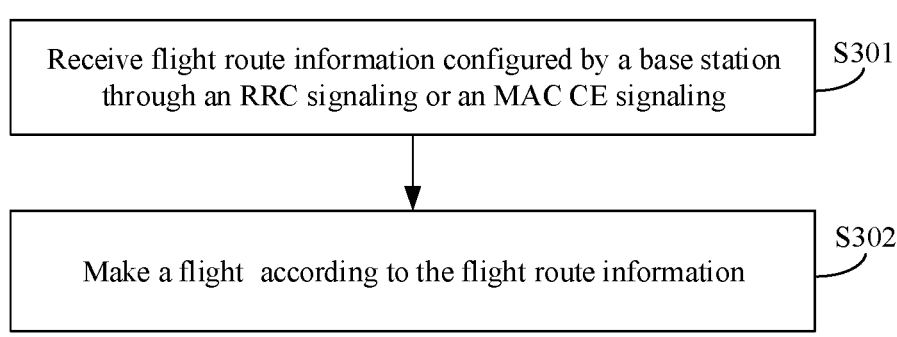
FIG. 3 is a flowchart illustrating a flight method according to an example of the present disclosure.

FIG. 3 is a flowchart illustrating a flight method according to an example of the present disclosure. In this example, descriptions are made from a UAV in a connected state side. As shown in FIG. 3, the flight method includes the following steps.

At step S301, flight route information configured by a base station through an RRC signaling or an MAC CE signaling is received.

The flight route information may include but not limited to one or more of flight route point information, flying speed, flying height, information about arrival time for each flight route point and take-off time for each flight route point of the UAV.

At step S302, a flight is made according to the flight route information.

In the above example, by receiving flight route information configured by a base station through a RRC signaling or a MAC CE signaling, and making a flight according to the flight route information, it can be achieved that the flight is made according to the flight route information configured by the base station.

Figure 4:
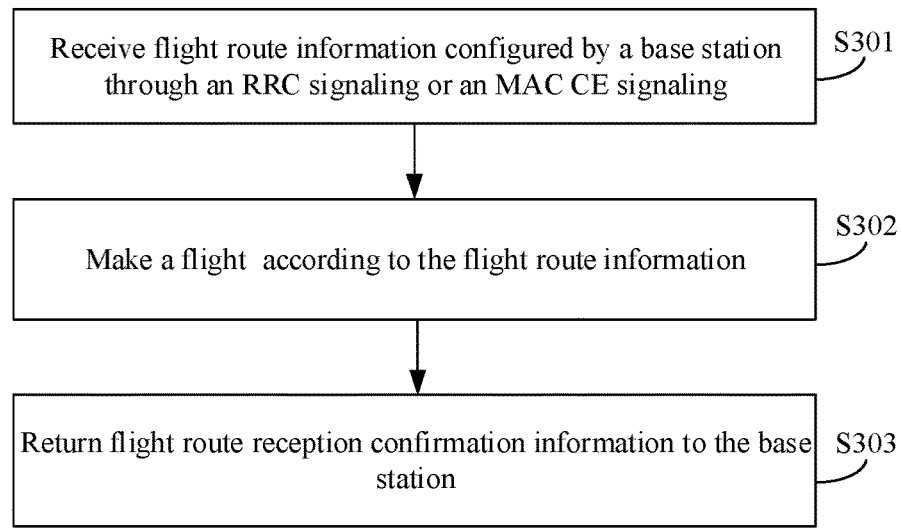
FIG. 4 is a flowchart illustrating another flight method according to an example of the present disclosure.

FIG. 4 is a flowchart illustrating another flight method according to an example of the present disclosure. As shown in FIG. 4, after step S301 is performed, the flight method may further include the following step.

At step S303, flight route reception confirmation information is returned to the base station.

Optionally, the method may further include: returning flight route configuration completion information to the base station. In this way, the base station knows whether the UAV completes the configuration of the flight route information.

If the flight route information is configured by the base station through an RRC connection reconfiguration signaling added with a flight route information unit, the flight route reception confirmation information may be returned to the base station through an RRC connection reconfiguration complete (RRCconnectionreconfigurationcomplete) signaling.

In the above example, by returning flight route reception confirmation information to a base station, the base station may know that a UAV already receives flight route information.

Figure 5:
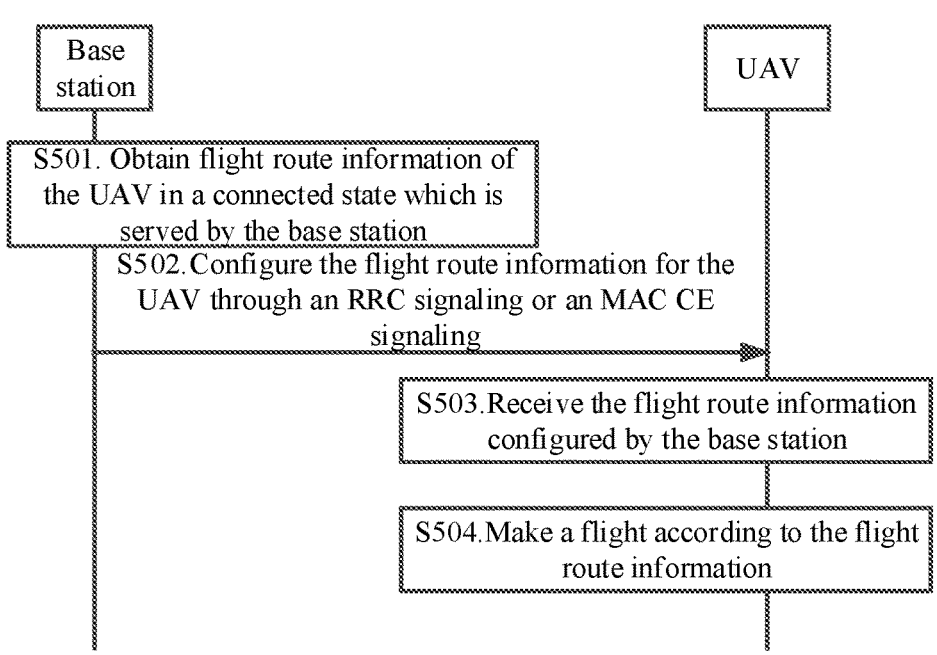
FIG. 5 illustrates a signaling flowchart of a flight method according to an example of the present disclosure.

FIG. 5 illustrates a signaling flowchart of a flight method according to an example of the present disclosure. In this example, descriptions are made from the perspective of interaction between a UAV in a connected state and a base station. As shown in FIG. 5, the flight method includes the following steps.

At step S501, the base station obtains flight route information of the UAV in a connected state which is served by the base station.

At step S502, the base station configures the flight route information for the UAV through an RRC signaling or an MAC CE signaling.

At step S503, the UAV receives the flight route information configured by the base station.

At step S504, the UAV makes a flight according to the flight route information.

Figure 6:
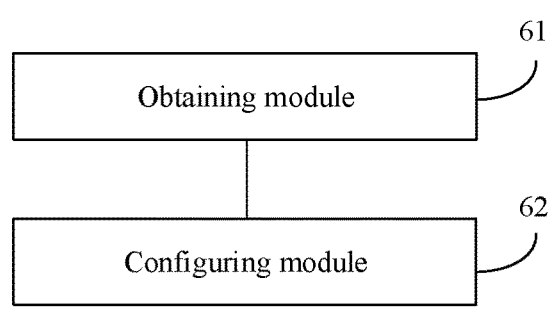
FIG. 6 is a block diagram illustrating an apparatus for configuring a flight route according to an example of the present disclosure.

In the above example, through interaction between a base station and a UAV in a connected state, the base station may configure flight route information for the UAV in a connected state, and thus the UAV may make a flight according to the flight route information FIG. 6 is a block diagram illustrating an apparatus for configuring a flight route according to an example of the present disclosure. The apparatus may be located in a base station. As shown in FIG. 6, the apparatus includes the following modules.

An obtaining module 61 is configured to obtain flight route information of a UAV in a connected state which is served by the base station.

The flight route information may include but not limited to one or more of flight route point information, flying speed, flying height, information about arrival time for each flight route point and take-off time for each flight route point of the UAV.

A configuring module 62 is configured to configure the flight route information, obtained by the obtaining module 61, for the UAV through an RRC signaling or an MAC CE signaling.

The RRC signaling may include an RRC connection reconfiguration signaling added with a flight route information unit. The MAC CE signaling includes a newly-added MAC CE signaling.

In the above example, by obtaining the flight route information of a UAV in a connected state which is served by the base station and configuring the flight route information for the UAV through an RRC signaling or an MAC CE signaling, it enables the base station to configure the flight route information for the UAV in a connected state, and thus, the UAV may make a flight according to the flight route information.

Figure 7:
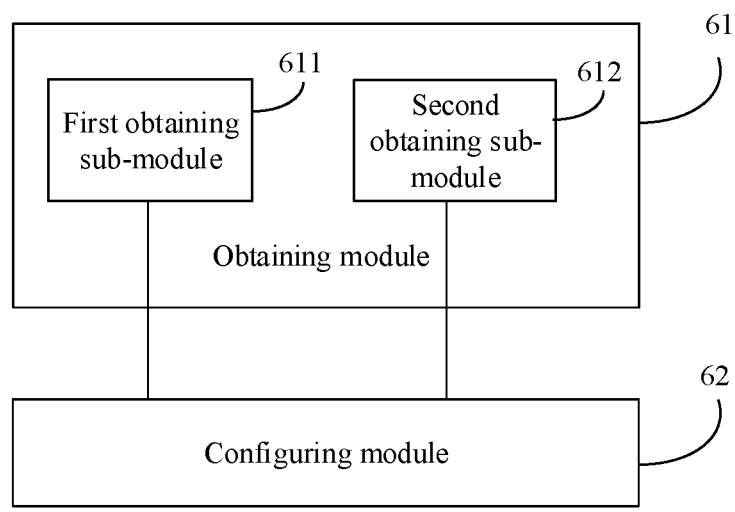
FIG. 7 is a block diagram illustrating another apparatus for configuring a flight route according to an example of the present disclosure.

FIG. 7 is a block diagram illustrating another apparatus for configuring a flight route according to an example of the present disclosure. As shown in FIG. 7, on the basis of the above example shown in FIG. 6, the obtaining module 61 may include a first obtaining sub-module 611 or a second obtaining sub-module 612.

The first obtaining sub-module 611 is configured to obtain the flight route information from a UAV management system.

The second obtaining sub-module 612 is configured to obtain the flight route information from a core network.

In the above example, the flight route information of the UAV in a connected state which is served by the base station may be obtained in several manners, which is not limited herein.

Figure 8:
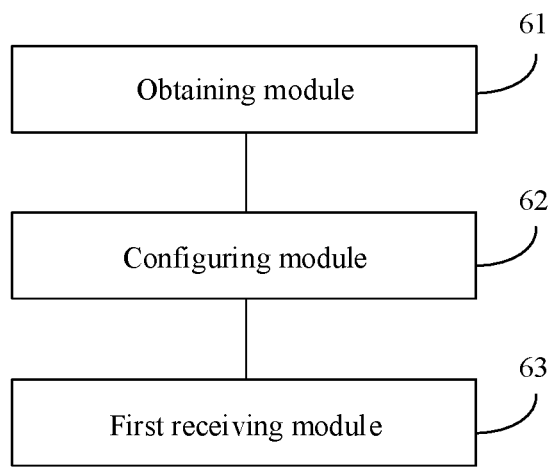
FIG. 8 is a block diagram illustrating still another apparatus for configuring a flight route according to an example of the present disclosure.

FIG. 8 is a block diagram illustrating still another apparatus for configuring a flight route according to an example of the present disclosure. As shown in FIG. 8, on the basis of the above example shown in FIG. 6, the apparatus may further include the following module.

A first receiving module 63 is configured to receive flight route reception confirmation information returned by the UAV after the flight route information for the UAV is configured by the configuring module through the RRC signaling or the MAC CE signaling.

In the above example, by receiving flight route reception confirmation information returned by a UAV, a base station may know that the UAV already receives flight route information.

Figure 9:
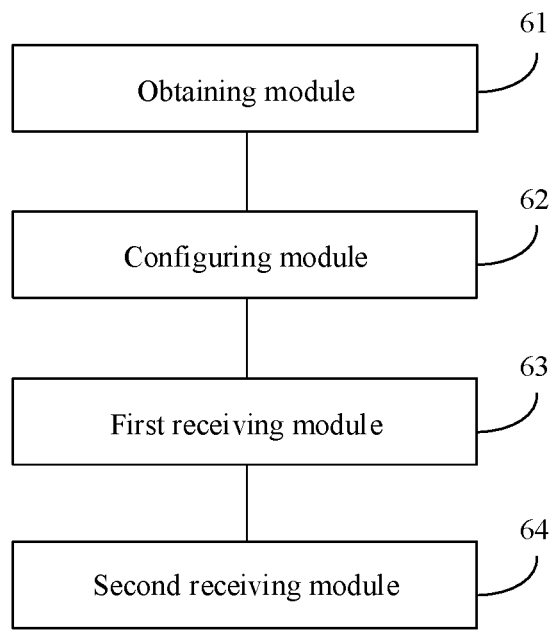
FIG. 9 is a block diagram illustrating yet another apparatus for configuring a flight route according to an example of the present disclosure.

FIG. 9 is a block diagram illustrating yet another apparatus for configuring a flight route according to an example of the present disclosure. As shown in FIG. 9, on the basis of the above example shown in FIG. 8, the apparatus may further include the following module.

A second receiving module 64 is configured to receive flight route configuration completion information returned by the UAV when the flight route reception confirmation information returned by the UAV is received by the first receiving module 63.

In the above example, by receiving flight route configuration completion information returned by a UAV, a base station may know that the UAV completes configuration of the flight route information.

Figure 10:
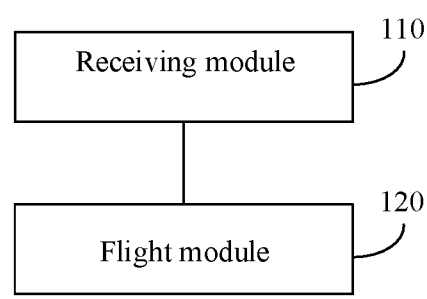
FIG. 10 is a block diagram illustrating a flight apparatus according to an example of the present disclosure.

FIG. 10 is a block diagram illustrating a flight apparatus according to an example of the present disclosure. The apparatus may be located in a UAV in a connected state. As shown in FIG. 10, the apparatus includes the following modules.

A receiving module 110 is configured to receive flight route information configured by a base station through an RRC signaling or an MAC CE signaling.

The flight route information may include but not limited to one or more of flight route point information, flying speed, flying height, information about arrival time for each flight route point and take-off time for each flight route point of the UAV.

A flight module 120 is configured to make a flight according to the flight route information received by the receiving module 110.

In the above example, by receiving flight route information configured by a base station through an RRC signaling or an MAC CE signaling, and making a flight according to the flight route information, it can be achieved that the flight is made according to the flight route information configured by the base station.

Figure 11:
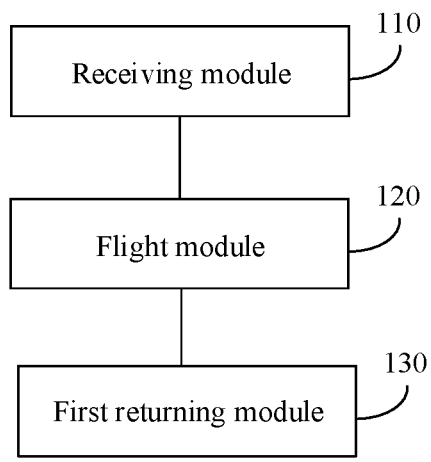
FIG. 11 is a block diagram illustrating another flight apparatus according to an example of the present disclosure.

FIG. 11 is a block diagram illustrating another flight apparatus according to an example of the present disclosure. As shown in FIG. 11, on the basis of the above example shown in FIG. 10, the apparatus may further include the following module.

A first returning module 130 is configured to return flight route reception confirmation information to the base station after the flight route information configured by the base station through the RRC signaling or the MAC CE signaling is received by the receiving module 110.

If the flight route information is configured by the base station through an RRC connection reconfiguration signaling added with a flight route information unit, the flight route reception confirmation information may be returned to the base station through an RRC connection reconfiguration complete signaling.

In the above example, by returning flight route reception confirmation information to a base station, the base station may know that a UAV already receives flight route information.

Figure 12:
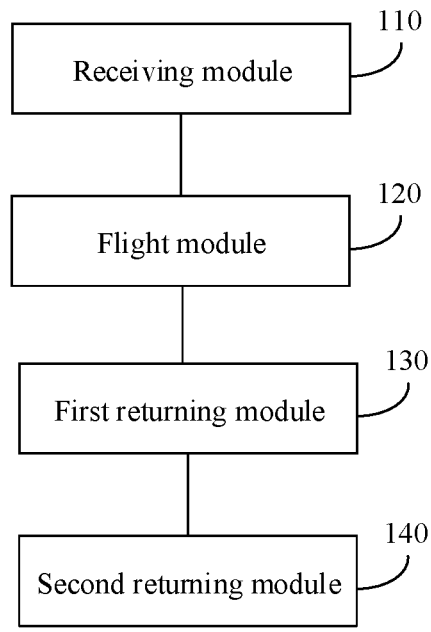
FIG. 12 is a block diagram illustrating still another flight apparatus according to an example of the present disclosure.

FIG. 12 is a block diagram illustrating still another flight apparatus according to an example of the present disclosure. As shown in FIG. 12, on the basis of the above example shown in FIG. 11, the apparatus may further include the following module.

A second returning module 140 is configured to return flight route configuration completion information to the base station when the flight route reception confirmation information is returned to the base station by the first returning module 130.

In the above example, by returning flight route configuration completion information to a base station, the base station may know whether a UAV completes configuration of the flight route information.

Figure 13:
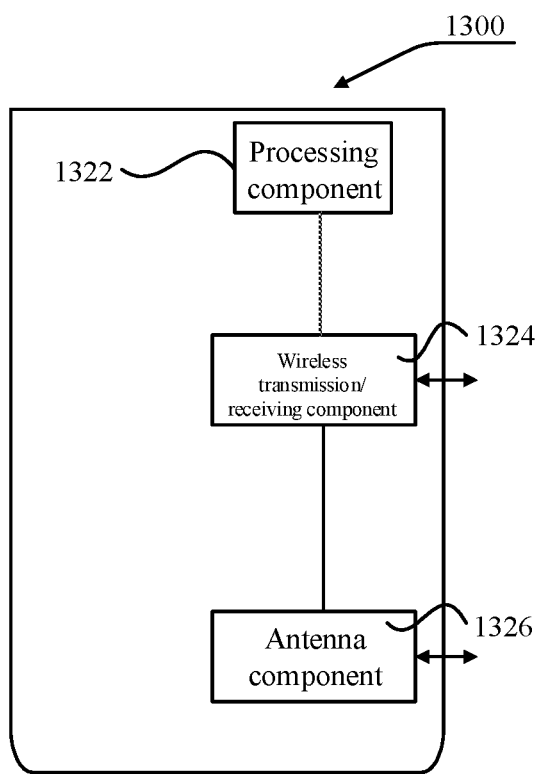
FIG. 13 is a block diagram of an apparatus for configuring a flight route according to an example of the present disclosure.

FIG. 13 illustrates a block diagram of an apparatus for configuring a flight route according to an example of the present disclosure. The apparatus 1300 may be provided as a base station. As shown in FIG. 13, the apparatus 1300 includes a processing component 1322, a wireless transmitting/receiving component 1324, an antenna component 1326 and a signal processing portion specific to a wireless interface. The processing component 1322 may further include one or more processors.

One of the processors in the processing component 1322 may be configured to:

obtain flight route information of a UAV in a connected state which is served by the base station; and configure the flight route information for the UAV through an RRC signaling or an MAC CE signaling.

In an example, there is further provided a non-transitory computer readable storage medium including instructions. The above instructions may be executed by the processing component 1322 of the apparatus 1300 to complete the above method of configuring a flight route. For example, the non-transitory computer readable storage medium may be a Read-Only Memory (ROM), a Random Access Memory (RAM), a CD-ROM, a magnetic tape, a floppy disk, an optical data storage device, and the like.

Figure 14:
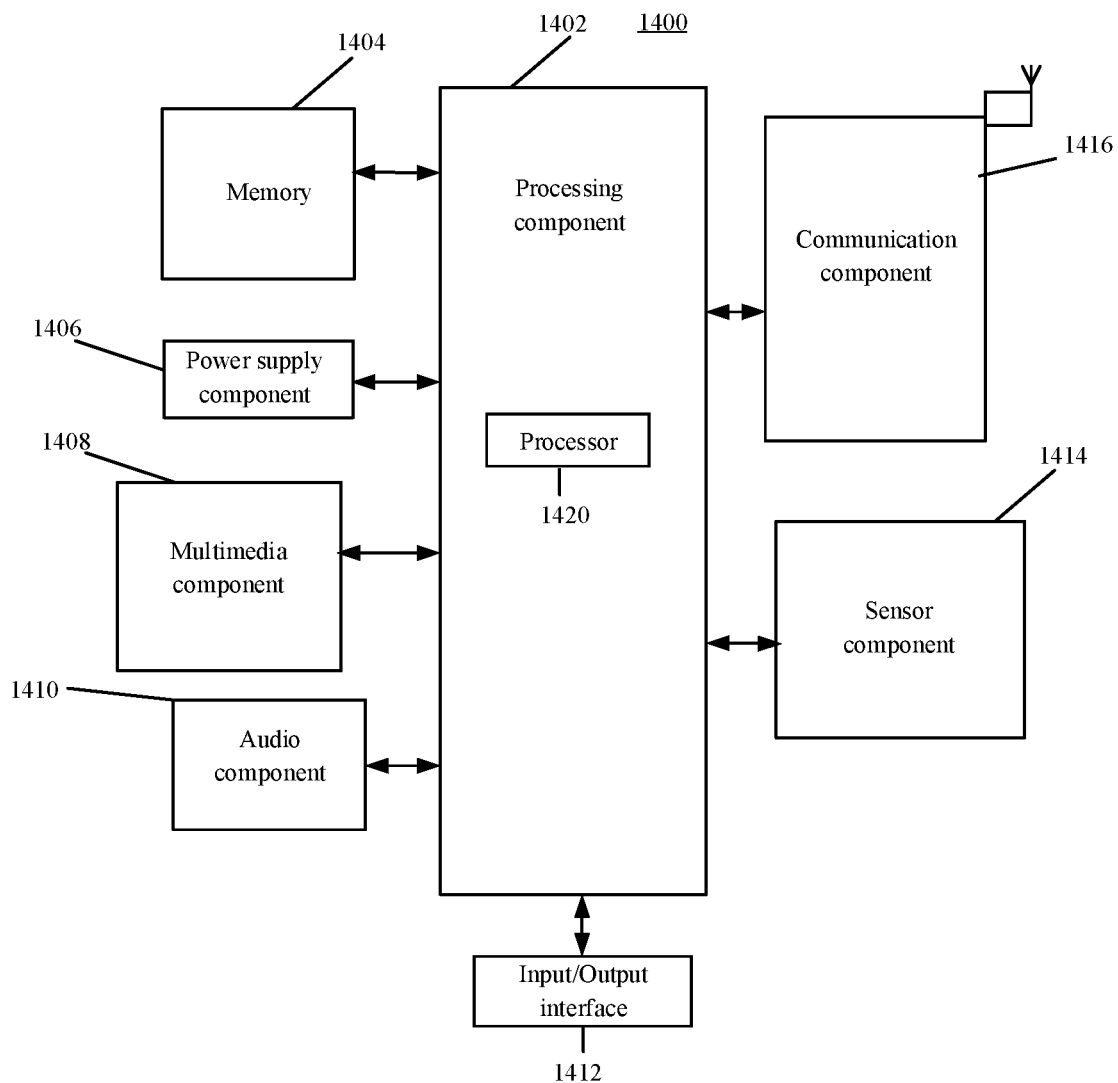
FIG. 14 illustrates a block diagram applicable to a flight apparatus according to an example of the present disclosure.

FIG. 14 illustrates a block diagram applicable to a flight apparatus according to an example of the present disclosure. For example, the apparatus 1400 may be a user device such as a mobile phone, a computer, a digital broadcast terminal, a message transceiving device, a game console, a tablet device, medical equipment, fitness equipment, a personal digital assistant, and an unmanned aerial vehicle.

As shown in FIG. 14, the apparatus 1400 may include one or more of the following components: a processing component 1402, a memory 1404, a power supply component 1406, a multimedia component 1408, an audio component 1410, an input/output (I/O) interface 1412, a sensor component 1414 and a communication component 1416.

The processing component 1402 generally controls overall operations of the apparatus 1400, such as operations associated with display, phone calls, data communications, camera operations, and recording operations. The processing component 1402 may include one or more processors 1420 to execute instructions so as to complete all or part of the steps of the above methods. In addition, the processing component 1402 may include one or more modules to facilitate the interaction between the processing component 1402 and other components. For example, the processing component 1402 may include a multimedia module to facilitate the interaction between the multimedia component 1408 and the processing component 1402.

One of the processors 1420 in the processing component 1402 may be configured to:

receive flight route information configured by a base station through an RRC signaling or an MAC CE signaling; and make a flight according to the flight route information.

The memory 1404 is configured to store various types of data to support the operation of the apparatus 1400. Examples of such data include instructions for any application or method operated on the apparatus 1400, contact data, phonebook data, messages, pictures, videos, and so on. The memory 1404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1406 supplies power for different components of the apparatus 1400. The power supply component 1406 may include a power supply management system, one or more power supplies, and other components associated with generating, managing and distributing power for the apparatus 1400.

The multimedia component 1408 includes a screen providing an output interface between the apparatus 1400 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1408 may include a front camera and/or a rear camera. The front camera and/or rear camera may receive external multimedia data when the apparatus 1400 is in an operating mode, such as a photographing mode or a video mode. Each of the front camera and the rear camera may be a fixed optical lens system or have focal length and optical zooming capability.

The audio component 1410 is to output and/or input an audio signal. For example, the audio component 1410 includes a microphone (MIC). When the apparatus 1400 is in an operating mode, such as a call mode, a record mode and a voice recognition mode, the microphone is to receive an external audio signal. The received audio signal may be further stored in the memory 1404 or sent via the communication component 1416. In some examples, the audio component 1410 further includes a speaker for outputting an audio signal.

The I/O interface 1412 provides an interface between the processing component 1402 and a peripheral interface module. The above peripheral interface module may be a keyboard, a click wheel, buttons, or the like. These buttons may include but not limited to, a home button, a volume button, a start button and a lock button.

The sensor component 1414 includes one or more sensors to provide status assessments of various aspects for the apparatus 1400. For example, the sensor component 1414 may detect the on/off status of the apparatus 1400, and relative positioning of the component, for example, the component is a display and a keypad of the apparatus 1400. The sensor component 1414 may also detect a change in position of the apparatus 1400 or a component of the apparatus 1400, a presence or absence of the contact between a user and the apparatus 1400, an orientation or an acceleration/deceleration of the apparatus 1400, and a change in temperature of the apparatus 1400. The sensor component 1414 may include a proximity sensor to detect the presence of a nearby object without any physical contact. The sensor component 1414 may further include an optical sensor, such as a Complementary Metal-Oxide-Semiconductor (CMOS) or Charged Coupled Device (CCD) image sensor which is used in imaging applications. In some examples, the sensor component 1414 may further include an acceleration sensor, a gyroscope sensor, a magnetic sensor, a pressure sensor, or a temperature sensor.

The communication component 1416 is to facilitate wired or wireless communication between the apparatus 1400 and other devices. The apparatus 1400 may access a wireless network based on a communication standard, such as Wi-Fi, 2G, 3G, 4G or 5G, or a combination thereof. In an example, the communication component 1416 receives a broadcast signal or broadcast related information from an external broadcast management system via a broadcast channel. In an example, the communication component 1416 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 1400 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 1404 including instructions. The above instructions may be executed by the processor 1420 of the apparatus 1400 to complete the above method. For example, the non-transitory computer readable storage medium may be a Read-Only Memory (ROM), a Random Access Memory (RAM), a CD-ROM, a magnetic tape, a floppy disk, an optical data storage device, and the like.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

It is to be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

After considering the specification and practicing the present disclosure, the persons skilled in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only and the real scope and spirit of the present disclosure are indicated by the claims of the present disclosure.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of configuring a flight route, comprising:
  obtaining, by a base station, flight route information of an unmanned aerial vehicle (UAV) in a connected state, wherein the base station serves the UAV, and the flight route information comprises: flight route point information, information about arrival time for each flight route point and take-off time for each flight route point of the UAV;

configuring, by the base station, the flight route information for the UAV through a media access control (MAC) control element (CE) signaling, wherein the MAC CE signaling comprises a newly-added MAC CE signaling;

receiving, by the base station, flight route reception confirmation information returned by the UAV after configuring the flight route information for the UAV through the MAC CE signaling; and receiving, by the base station, flight route configuration completion information returned by the UAV.

2. The method according to claim 1, wherein obtaining the flight route information of the UAV in the connected state comprises:

obtaining the flight route information from a UAV management system; or obtaining the flight route information from a core network.

3. The method according to claim 1, wherein the flight route information further comprises one or more of following parameters: flying speed, and flying height.

4. A flight method, comprising:

receiving, by an unmanned aerial vehicle (UAV) in a connected state, flight route information configured by a base station through a media access control (MAC) control element (CE) signaling, wherein the MAC CE signaling comprises a newly-added MAC CE signaling, and the flight route information comprises: flight route point information, information about arrival time for each flight route point and take-off time for each flight route point of the UAV;

returning, by the UAV, flight route reception confirmation information to the base station after receiving the flight route information configured by the base station through the MAC CE signaling;

returning, by the UAV, flight route configuration completion information to the base station; and making, by the UAV, a flight according to the flight route information.

5. The method according to claim 4, wherein the flight route information further comprises one or more of following parameters: flying speed, and flying height.

6. A base station, comprising:

one or more processors, and a non-transitory computer-readable storage medium for storing instructions executable by the one or more processors, wherein the one or more processors are configured to perform acts comprising:

obtaining flight route information of an unmanned aerial vehicle (UAV) in a connected state, wherein the base station serves the UAV, and the flight route information comprises: flight route point information, information about arrival time for each flight route point and take-off time for each flight route point of the UAV;

configuring the flight route information for the UAV through a media access control (MAC) control element (CE) signaling, wherein the MAC CE signaling comprises a newly-added MAC CE signaling;

receiving flight route reception confirmation information returned by the UAV after configuring the flight route information for the UAV through the the MAC CE signaling; and receiving flight route configuration completion information returned by the UAV.

7. An unmanned aerial vehicle (UAV), comprising:

one or more processors, and a non-transitory computer-readable storage medium for storing instructions executable by the one or more processors, wherein the one or more processors are configured to perform acts comprising:

receiving flight route information configured by a base station through a media access control (MAC) control element (CE) signaling, wherein the MAC CE signaling comprises a newly-added MAC CE signaling, and the flight route information comprises: flight route point information, information about arrival time for each flight route point and take-off time for each flight route point of the UAV;

returning flight route reception confirmation information to the base station after receiving the flight route information configured by the base station through the MAC CE signaling;

returning flight route configuration completion information to the base station; and making a flight according to the flight route information.

* * * * *